US012583193B2

(12) United States Patent
Yano et al.

(10) Patent No.: US 12,583,193 B2
(45) Date of Patent: *Mar. 24, 2026

(54) PRODUCTION APPARATUS FOR PRODUCING A FIBER-REINFORCED RESIN AND A PRODUCTION METHOD FOR PRODUCING A FIBER-REINFORCED RESIN

(71) Applicant: Mitsui Chemicals, Inc., Tokyo (JP)

(72) Inventors: Masahiro Yano, Nagoya (JP); Atsushi Miyata, Urayasu (JP)

(73) Assignee: MITSUI CHEMICALS, INC., Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 18/552,264

(22) PCT Filed: Mar. 17, 2022

(86) PCT No.: PCT/JP2022/012154
§ 371 (c)(1),
(2) Date: Sep. 25, 2023

(87) PCT Pub. No.: WO2022/202587
PCT Pub. Date: Sep. 29, 2022

(65) Prior Publication Data
US 2024/0157661 A1 May 16, 2024

(30) Foreign Application Priority Data

Mar. 26, 2021 (JP) .............................. JP2021-053384

(51) Int. Cl.
*B29C 70/50* (2006.01)
*B29C 70/20* (2006.01)
(Continued)

(52) U.S. Cl.
CPC .............. *B29C 70/50* (2013.01); *B29C 70/20* (2013.01); *B29C 70/545* (2013.01);
(Continued)

(58) Field of Classification Search
CPC .... D03D 33/00; D03D 41/004; D03D 41/008; D03D 43/10; D03D 43/04; D03D 47/362;
(Continued)

(56) References Cited

U.S. PATENT DOCUMENTS 209,927 A * 11/1878 Shackleton ............... D03J 1/16
28/186
621,575 A * 3/1899 Kip ........................ D03D 51/28
139/353
(Continued)

FOREIGN PATENT DOCUMENTS

EP          0989218 A1     3/2000
JP          H0411052 A     1/1992
(Continued)

*Primary Examiner* — Matthew J Daniels
(74) *Attorney, Agent, or Firm* — BUCHANAN INGERSOLL & ROONEY PC

(57) ABSTRACT

The present application provides an apparatus that is for producing a fiber-reinforced resin having reinforcement fibers aligned in one direction and that is capable of, with a relatively simple configuration, connecting a preceding reinforcement fiber and a subsequent reinforcement fiber when switching between the reinforcement fibers. An apparatus according to the present invention is for producing a fiber-reinforced resin having reinforcement fibers aligned in one direction, and comprises: an impregnation part which impregnates a reinforcement fiber with a resin; and a switching device which performs switching of reinforcement fibers on the upstream side of the impregnation part, from a preceding reinforcement fiber to a new reinforcement fiber. During the switching operation, the switching device forms a fabric using the preceding reinforcement fiber and the new (Continued)

reinforcement fiber as warp and other fibers as weft so as to connect the new reinforcement fiber with the preceding reinforcement fiber.

10 Claims, 5 Drawing Sheets

(51) Int. Cl.
| | |
|---|---|
| *B29C 70/54* | (2006.01) |
| *B29K 105/08* | (2006.01) |
| *B29K 507/04* | (2006.01) |

(52) U.S. Cl.
CPC ................. *B29C 2793/0027* (2013.01); *B29K 2105/0881* (2013.01); *B29K 2507/04* (2013.01)

(58) Field of Classification Search
CPC .... D03D 47/363; D03D 47/364; D03D 49/06; D03D 49/14; D03D 49/50; B29C 70/50
See application file for complete search history.

(56) References Cited

U.S. PATENT DOCUMENTS

| | | | | |
|---|---|---|---|---|
| 649,920 | A | * | 5/1900 | Ellis ....................... D03D 41/00 |
| | | | | 139/54 |
| 916,596 | A | * | 3/1909 | Rhoades ................ D03D 51/20 |
| | | | | 139/369 |
| 1,082,474 | A | * | 12/1913 | Colman .................... D03J 1/16 |
| | | | | 28/212 |
| 1,145,124 | A | * | 7/1915 | Cutting ................. D03D 51/20 |
| | | | | 139/358 |
| 1,294,482 | A | * | 2/1919 | Kremers ................ D03D 51/30 |
| | | | | 139/354 |
| 1,444,070 | A | * | 2/1923 | Hall ...................... B60C 9/0042 |
| | | | | 139/426 R |
| 1,776,912 | A | * | 9/1930 | Klein ....................... D03J 1/16 |
| | | | | 289/3 |
| 2,142,025 | A | * | 12/1938 | Hall ....................... D03D 39/16 |
| | | | | 139/21 |
| 3,779,789 | A | * | 12/1973 | Park ....................... D01F 11/14 |
| | | | | 427/389.9 |
| 3,818,082 | A | * | 6/1974 | Burns .................... D03D 15/41 |
| | | | | 139/420 R |
| 3,908,247 | A | * | 9/1975 | Murphy ............. D06B 11/0036 |
| | | | | 28/178 |
| 4,428,992 | A | | 1/1984 | Street |
| 4,760,628 | A | * | 8/1988 | Kaufmann ................ D03J 1/14 |
| | | | | 28/208 |
| 4,773,137 | A | * | 9/1988 | Joos ....................... D02H 13/36 |
| | | | | 28/209 |
| 5,266,139 | A | | 11/1993 | Yokota et al. |
| 6,425,969 | B1 | | 7/2002 | Aker |
| 6,585,842 | B1 | * | 7/2003 | Bompard ............. B29C 70/202 |
| | | | | 156/273.1 |
| 2007/0044896 | A1 | * | 3/2007 | Tingley ................. B65H 69/00 |
| | | | | 156/580 |
| 2008/0318020 | A1 | | 12/2008 | Barnaud |
| 2013/0074663 | A1 | * | 3/2013 | Pedigo ................. B29C 70/384 |
| | | | | 83/13 |
| 2013/0118633 | A1 | * | 5/2013 | Studer .................... D03D 35/00 |
| | | | | 139/11 |
| 2014/0150922 | A1 | * | 6/2014 | Lecostaouec .......... D03D 3/005 |
| | | | | 139/420 R |
| 2014/0346270 | A1 | | 11/2014 | Tanigawa et al. |
| 2017/0252988 | A1 | * | 9/2017 | Tashiro ................ B29C 70/521 |
| 2019/0135576 | A1 | | 5/2019 | Syuto |
| 2023/0241847 | A1 | * | 8/2023 | Kuniya .................. B29C 70/06 |
| | | | | 264/257 |

FOREIGN PATENT DOCUMENTS

| | | | | |
|---|---|---|---|---|
| JP | H0780836 A | 3/1995 | | |
| JP | 2001525749 A | 12/2001 | | |
| JP | 2006052043 A | 2/2006 | | |
| JP | 2008143087 A | * | 6/2008 | ............ B29C 70/16 |
| JP | 2009066917 A | 4/2009 | | |
| JP | 2011094244 A | 5/2011 | | |
| JP | 2014034737 A | 2/2014 | | |

* cited by examiner

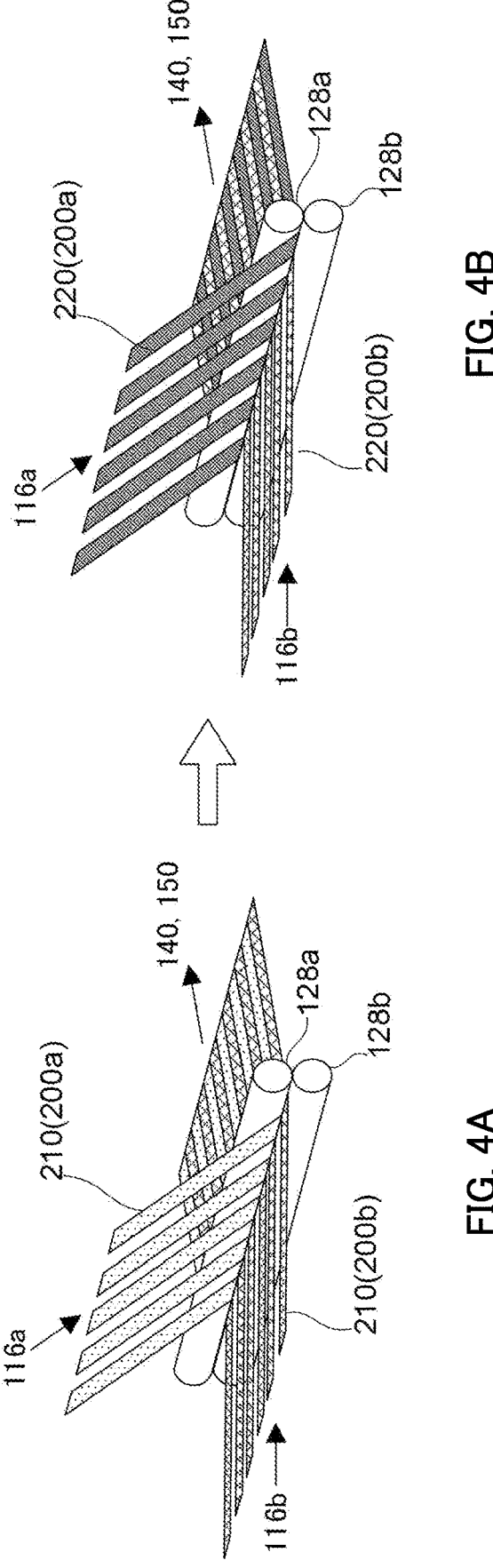

PRODUCTION APPARATUS FOR PRODUCING A FIBER-REINFORCED RESIN AND A PRODUCTION METHOD FOR PRODUCING A FIBER-REINFORCED RESIN

TECHNICAL FIELD

The present invention relates to a production apparatus for producing a fiber-reinforced resin and a production method for producing a fiber-reinforced resin.

BACKGROUND ART

A fiber-reinforced resin (hereinafter, simply referred to as "Uni-Direction (UD) sheet") is known, which includes a plurality of reinforcing fibers arranged to be oriented in a single direction and a resin composition (matrix resin) impregnating the reinforcing fibers. This UD sheet is lighter in weight than a metal sheet, and nevertheless has a higher mechanical strength. Thus, the UD sheet has been studied for use as a reinforcing material or the like for covering the surface of a resin-molded article.

The UD sheet is usually produced by impregnating a reinforcing fiber fed out from a roll body with a resin material (see, for example, Patent Literature (hereinafter, referred to as "PTL") 1).

When the UD sheet is produced, a plurality of roll bodies are disposed in a creel, and reinforcing fibers are fed out from the roll bodies. When one of the roll bodies finishes feeding the reinforcing fibers, the reinforcing fibers impregnated with the resin are switched to the reinforcing fibers (hereinafter, also simply referred to as "new reinforcing fibers") which are newly fed out from another one of the roll bodies. At this time, the new reinforcing fibers are connected to the reinforcing fibers (hereinafter, also simply referred to as "preceding reinforcing fibers") from the roll body which finishes feeding, so that the new reinforcing fibers are also impregnated with the resin continuously.

As a method for connecting the reinforcing fibers, PTL 2 describes a method of tying a fibrous material having characteristics making it unlikely for a knot to be untied even when the knot is pulled from opposite ends, and making it easier to untie the knot after the fibrous material is cut.

Further, PTL 3 describes a method of connecting reinforcing fibers by entangling the fibers with each other by an air jet, and PTL 4 describes an apparatus that includes a splicer for performing the connecting method and that automatically replaces a bobbin for supplying reinforcing fibers.

CITATION LIST

Patent Literature

PTL 1
Japanese Unexamined Patent Application Publication (Translation of PCT Application) No. 2001-525749
PTL 2
Japanese Patent Application Laid-Open No. 2011-94244
PTL 3
Japanese Patent Application Laid-Open No. 2006-52043
PTL 4
Japanese Patent Application Laid-Open No. 2009-66917

SUMMARY OF INVENTION

Technical Problem

When the UD sheet is produced, the reinforcing fibers are moved to a resin impregnation section while being tensioned. Therefore, when the reinforcing fibers are switched, it is necessary to connect the reinforcing fibers to each other so as not to be untied even by the above-described tension. PTL 2 describes the method of tying reinforcing fibers, in which a knot is unlikely to be untied even when pulled from opposite ends (even when tension is applied). However, this tying method is complicated, and automation by a machine is difficult. Thus, the reinforcing fibers need to be connected manually by an operator. When the reinforcing fibers are manually connected, a production apparatus needs to be stopped for a long period of time at the time of connection, and thus it is difficult to improve the production efficiency of the UD sheet.

Meanwhile, PTL 3 and PTL 4 describe the method of connecting reinforcing fibers by entangling the fibers with each other by an air jet, and the automatic switching apparatus for automatically switching the reinforcing fibers using the connecting method. However, the connection of the reinforcing fibers by the air jet is a relatively weak connection, and there is a possibility that the reinforcing fibers may be untied by tension.

Further, in production of the UD sheet, a plurality of reinforcing fibers fed out from a plurality of rolls are laterally arranged into a sheet shape, and the reinforcing fibers arranged in the sheet shape are impregnated with a resin. Therefore, an attempt to automate the switching of the reinforcing fibers by the method described in PTL 3 and PTL 4 simultaneously necessitates preparation of the same number of switching apparatuses as roll bodies that feed out the reinforcing fibers. It is thus not practical.

The present invention has been made in view of the above-described problems of the prior art, and an object of the present invention is to provide a production apparatus for producing a fiber-reinforced resin in which preceding and following reinforcing fibers can be connected at the time of switching of the reinforcing fibers, and in which reinforcing fibers are arranged to be oriented in a single direction, and a production method for producing the fiber-reinforced resin using the apparatus.

Solution to Problem

A production apparatus for producing a fiber-reinforced resin in which a reinforcing fiber is arranged to be oriented in a single direction according to one embodiment of the present invention for solving the above problem includes: an impregnation section that impregnates the reinforcing fiber with a resin; and a switching apparatus that switches the reinforcing fiber from a preceding reinforcing fiber to a new reinforcing fiber at an upstream side of the impregnation section. When switching the reinforcing fiber, the switching apparatus connects the new reinforcing fiber and the preceding reinforcing fiber to each other by forming a textile in which the preceding reinforcing fiber and the new reinforcing fiber are used as warp threads and another fiber is used as a weft thread.

Further, a production method for producing a fiber-reinforced resin in which a reinforcing fiber is arranged to be oriented in a single direction according to another embodiment of the present invention for solving the above problem includes producing the fiber-reinforced resin while switching the reinforcing fiber, by using a production apparatus for producing the fiber-reinforced resin.

Advantageous Effects of Invention

According to the present invention, a production apparatus for producing a fiber-reinforced resin in which the reinforcing fibers are arranged to be oriented in a single direction, the production apparatus being capable of connecting preceding and following reinforcing fibers at the time of switching of the reinforcing fibers with a relatively simple configuration, and, a production method for producing the fiber-reinforced resin using the apparatus are provided.

BRIEF DESCRIPTION OF DRAWINGS

FIG. 4A schematically illustrates the uniting section before switching, and FIG. 4B schematically illustrates the uniting section after switching.

DESCRIPTION OF EMBODIMENTS

Figure 1:
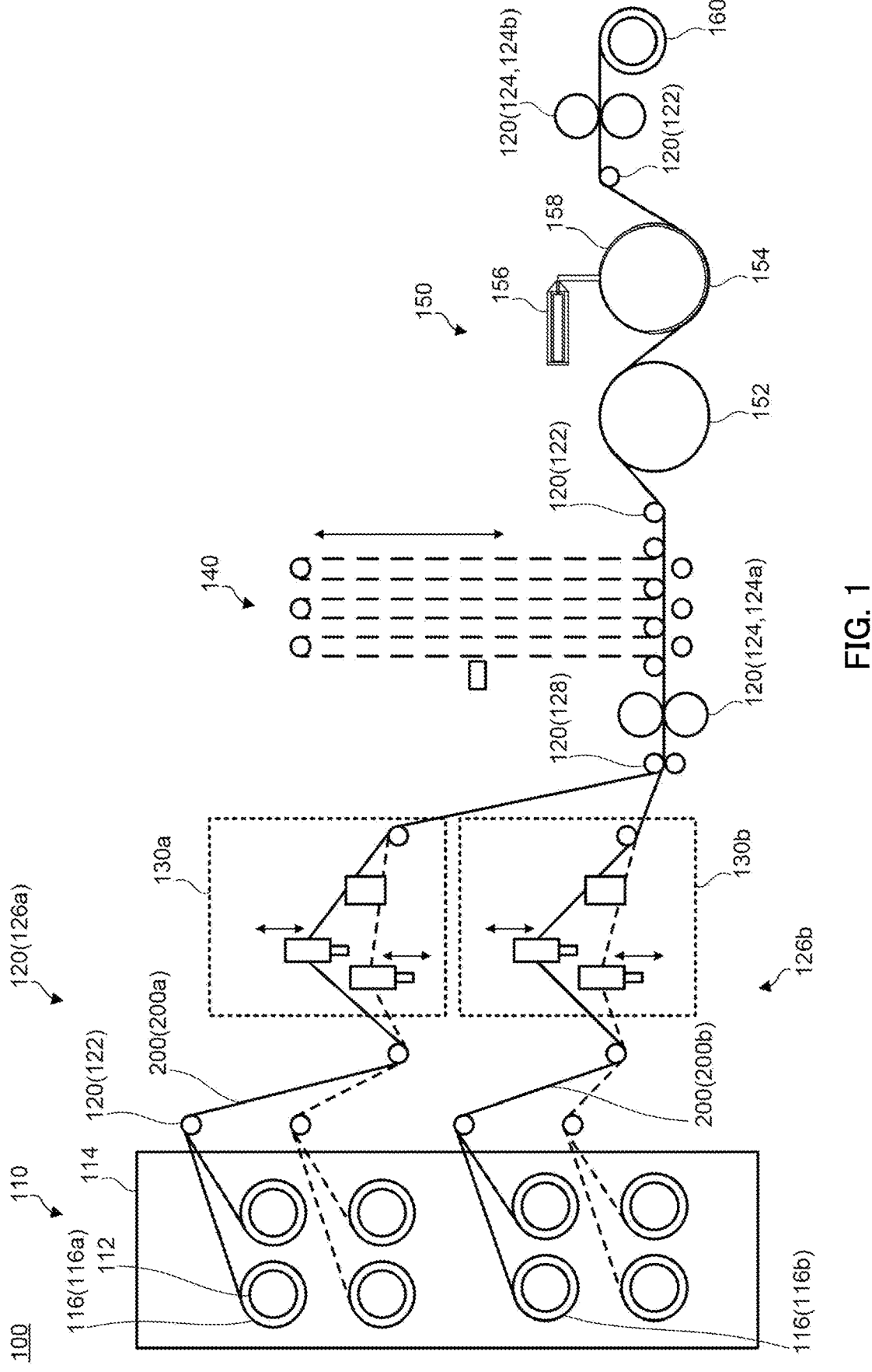
FIG. 1 schematically illustrates an exemplary configuration of a production apparatus for producing a fiber-reinforced resin in which reinforcing fibers are arranged to be oriented in a single direction according to one embodiment of the present invention.

FIG. 1 schematically illustrates an exemplary configuration of a production apparatus for producing a fiber-reinforced resin in which reinforcing fibers are arranged to be oriented in a single direction according to one embodiment of the present invention.

Production apparatus 100 for producing the fiber-reinforced resin in which the reinforcing fibers are arranged to be oriented in a single direction includes fiber feeding section 110, guide path 120, switching apparatus 130a and switching apparatus 130b, accumulator 140, impregnation section 150, and winding section 160.

Fiber feeding section 110 supplies the reinforcing fibers that are to be impregnated with resin in impregnation section 150 to form the fiber-reinforced resin. In the present embodiment, fiber feeding section 110 is creel 114 in which a plurality of spindles 112 are disposed, and bobbins 116 around which reinforcing fibers 200 are wound are rotatably installed respectively on spindles 112.

In the present embodiment, each of reinforcing fibers 200 is a carbon fiber. However, reinforcing fiber 200 may be any fiber used for the fiber-reinforced resin, such as a glass fiber and aramid fiber.

Guide path 120 guides reinforcing fibers 200 supplied from fiber feeding section 110 to the components of switching apparatus 130, accumulator 140, impregnation section 150, and winding section 160 in this order. Guide path 120 includes a plurality of guide rolls 122, and, feeders 124 each of which is composed of two rolls opposed to each other across reinforcing fiber 200. The two rolls constituting feeder 124 rotate in opposite directions and in such a manner as to nip the reinforcing fiber, thereby moving reinforcing fiber 200 on a movement path formed by guide rolls 122.

Reinforcing fiber 200 is continuously fed out from each of bobbins 116 and moved by feeders 124. Thus, reinforcing fibers 200 continue to move on guide path 120 without interrupted.

At this time, feeders 124 apply a predetermined tension to reinforcing fibers 200. Due to the tension, the reinforcing fibers are linearly oriented in the moving direction. By impregnating the reinforcing fibers in the aforementioned state with the resin at impregnation section 150, the UD sheet is produced which includes a plurality of reinforcing fibers 200 arranged to be oriented in a single direction and a matrix resin impregnating reinforcing fibers 200.

In the present embodiment, guide path 120 includes two feeders 124a and 124b. Feeder 124a is disposed on the downstream side of switching apparatus 130 and on the upstream side of accumulator 140 in the moving direction of reinforcing fibers 200, and adjusts the moving speed of reinforcing fibers 200 until the reinforcing fibers pass through switching apparatus 130 after fed out from fiber feeding section 110. Feeder 124b is disposed on the downstream side of impregnation section 150 and on the upstream side of winding section 160 in the moving direction of reinforcing fibers 200, and adjusts the moving speed of reinforcing fibers 200 passing through impregnation section 150. The moving speed of reinforcing fibers 200 by feeder 124b defines the production speed of the fiber-reinforced resin produced by production apparatus 100.

In addition, in the present embodiment, guide path 120 includes a plurality of holding sections 126a and 126b that, at different positions, hold reinforcing fibers 200a and reinforcing fibers 200b respectively fed out from bobbins 116a and bobbins 116b different from bobbin 116a. Further, guide path 120 includes uniting section 128 for uniting reinforcing fibers 200a and reinforcing fibers 200b held by holding section 126a and holding section 126b, respectively. Guide path 120 guides reinforcing fibers 200 united at uniting section 128 to accumulator 140 and impregnation section 150.

Figure 2:
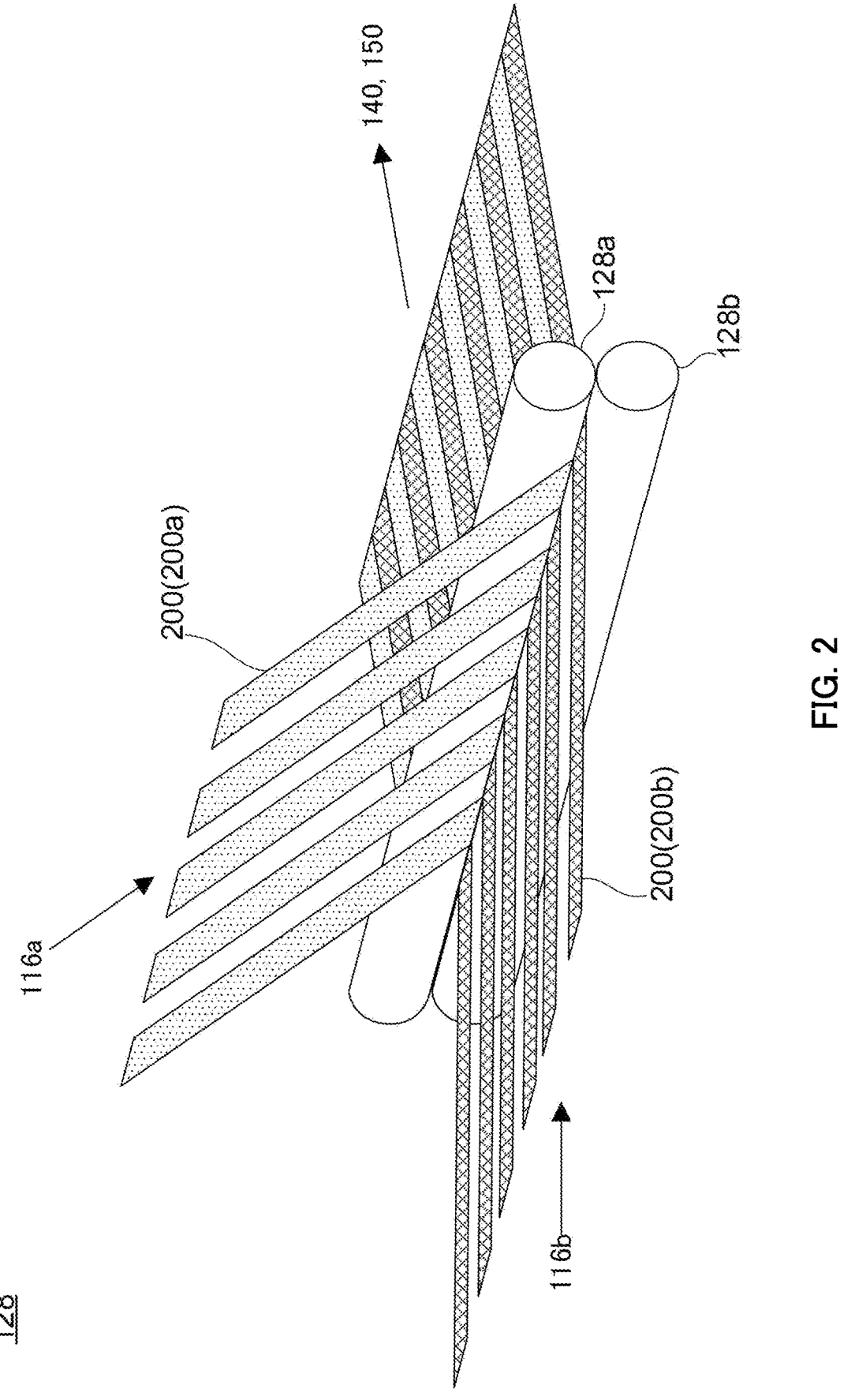
FIG. 2 schematically illustrates a state in which the reinforcing fibers are united at a uniting section.

FIG. 2 schematically illustrates a state in which reinforcing fibers 200a and reinforcing fibers 200b are united at uniting section 128. In the present embodiment, holding section 126a introduces, into uniting section 128, a plurality of reinforcing fibers 200a fed out from a plurality of bobbins 116a (five reinforcing fibers 200a fed out from five bobbins 116a in FIG. 2). Further, holding section 126b introduces, into uniting section 128, a plurality of reinforcing fibers 200b fed out from a plurality of bobbins 116b (five reinforcing fibers 200b fed out from five bobbins 116b in FIG. 2). In FIG. 2, reinforcing fibers 200 fed out from one bobbins 116 are collectively described as a single reinforcing fiber, but actually, each single reinforcing fiber 200 is a bundle (tow) of single fibers in which a plurality of single fibers are assembled and bound together by a binding member. In the present specification, for ease of understanding, a single tow is represented as single reinforcing fiber 200.

Each of holding section 126a and holding section 126b holds the plurality of reinforcing fibers 200 such that the reinforcing fibers are spaced from one another. Then, in uniting section 128, one of reinforcing fibers 200b held by holding section 126b is disposed in a gap between reinforcing fibers 200a held by holding section 126a. Then, uniting section 128 alternately disposes reinforcing fibers 200*a* held by holding section 126*a* and reinforcing fibers 200*b* held by holding section 126*b*, and pressurizes reinforcing fibers 200 in the thickness direction by the pair of rolls 128*a* and 128*b* to arrange and unite the reinforcing fibers into a sheet shape. As a result, the plurality of reinforcing fibers 200 fed out from the plurality of bobbins 116 can be arranged in a planar shape (sheet shape) without any gap. At this time, by disposing the end portions of adjacent reinforcing fibers 200 such that the end portions slightly overlap one another, the gaps between reinforcing fibers 200 may be more unlikely to occur. It is also possible to more evenly dispose the plurality of reinforcing fibers 200 fed out from the plurality of bobbins 116, and to suppress variations in physical properties of the UD sheet that could be caused due to uneven arrangement of the fibers in the produced UD sheet that is caused due to interference between the fibers during fiber opening.

Switching apparatus 130*a* and switching apparatus 130*b* are disposed on the respective holding sections, and switch the reinforcing fibers held by the respective holding sections from the preceding reinforcing fibers to the new reinforcing fibers.

The switching of reinforcing fibers 200 by switching apparatus 130*a* and switching apparatus 130*b* is performed when the remaining amount of reinforcing fibers 200*a* that can be fed out from bobbins 116*a* is small. Whether or not the remaining amount of reinforcing fibers 200*a* is small may be determined based on the amount of reinforcing fibers 200*a* having been fed out from bobbins 116*a*, or may be determined by measuring the amount of reinforcing fibers 200*a* currently wound on bobbins 116*a* (e.g., measuring the thickness or the like of the reinforcing fiber currently wound), or by reading, from fed reinforcing fibers 200*a*, a mark that is attached to reinforcing fibers 200*a* in advance and indicates that the remaining amount is small.

FIGS. 3A to 3D schematically illustrate a state in which switching apparatus 130*a* switches reinforcing fibers 210 held by holding section 126*a* to new reinforcing fibers 220.

Figure 3B:
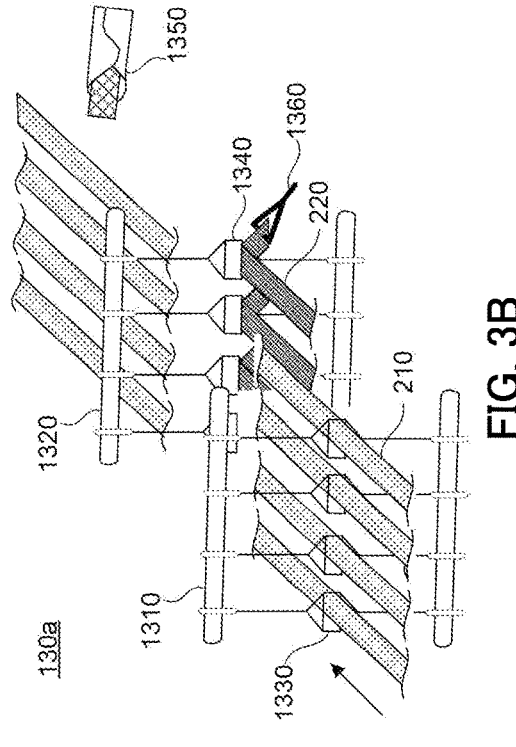
FIGS. 3A to 3D illustrate a state in which a switching apparatus switches the reinforcing fibers held by a holding section to new reinforcing fibers.
Figure 3D:
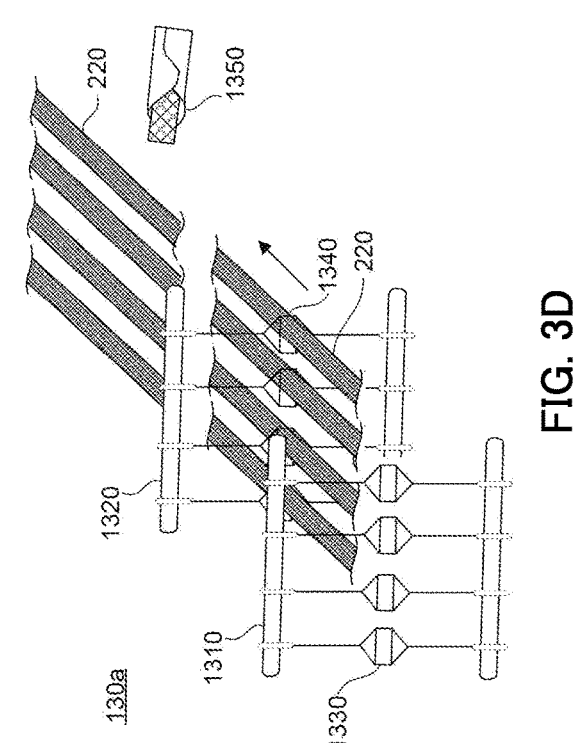
Figure 3A:
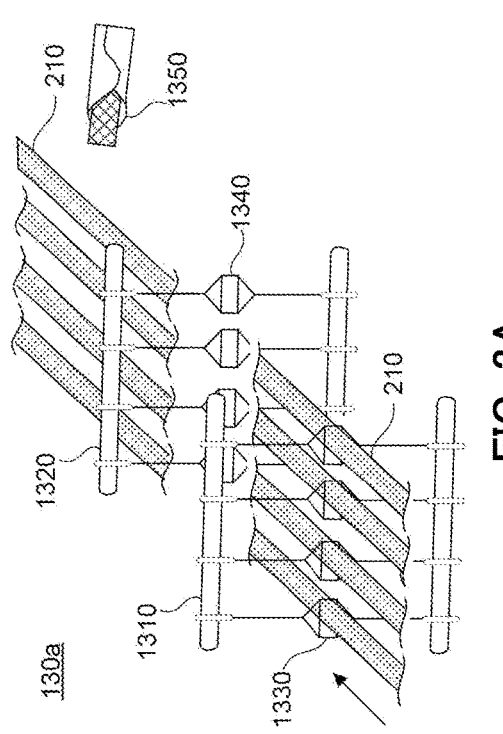

FIG. 3A schematically illustrates switching apparatus 130*a* prior to switching. Switching apparatus 130*a* includes two heald frames 1310 and 1320. Heald frame 1310 and heald frame 1320 include a plurality of healds 1330 (first healds) and a plurality of healds 1340 (second healds), respectively, and hold reinforcing fibers 200*a* by allowing reinforcing fibers 200*a* (preceding reinforced fibers 210) to pass through a plurality of healds 1330, respectively. As illustrated in FIG. 3A, when production apparatus 100 is in operation, reinforcing fibers 200*a* pass through only healds 1330 of one heald frame 1310. In addition, in the present embodiment, only reinforcing fiber 200*a* fed out from one bobbin 116*a* passes through one heald 1330, but reinforcing fibers 200*a* fed out from a plurality of bobbins 116*a* may pass through one heald 1330.

Figure 3C:
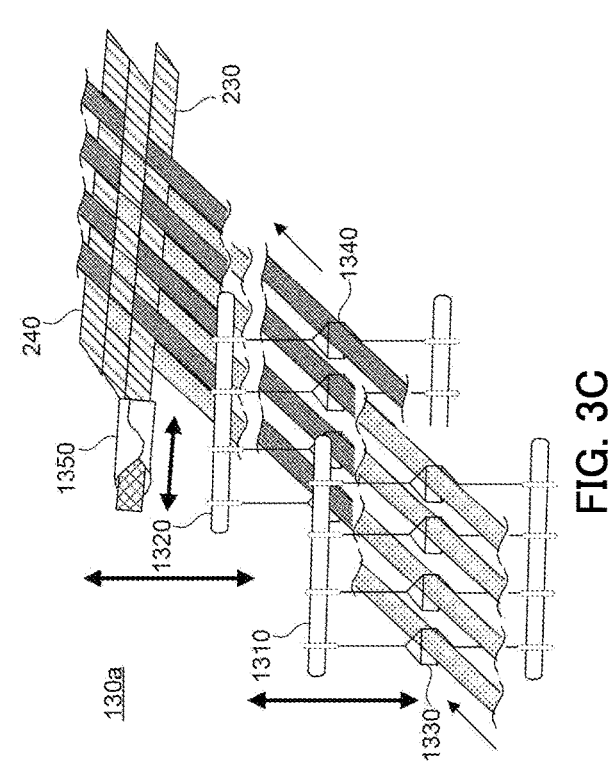

FIGS. 3B and 3C schematically illustrate switching apparatus 130*a* at a time when the reinforcing fibers to be impregnated with resin are switched to new reinforcing fibers. FIG. 3B illustrates the operation of switching apparatus 130*a* at a time when the remaining amount of reinforcing fibers 200*a* (preceding reinforcing fibers 210) that can be fed out from bobbins 116*a* and pass through heald frame 1310 is small. In FIG. 3B, gripping section 1360 grips the end portions of reinforcing fibers 200*a* (new reinforcing fibers 220) wound around bobbin 116*a* which are not feeding out the reinforcing fibers, and guides the end portions to another heald frame 1320 through which preceding reinforcing fibers 210 are not passing. New reinforcing fibers 220 are then passed through healds 1340 of the other heald frame 1320. In this state, new reinforcing fibers 220 are continuously fed out from bobbins 116*a*, and succeeding portions of new reinforcing fibers 220 continuously fed out are also caused to continue to pass through healds 1340.

At this time, preceding reinforcing fibers 210 continue to pass through healds 1330 of heald frame 1310.

As illustrated in FIG. 3C, in this state, heald frame 1310 and heald frame 1320 are alternately moved up and down, and the plurality of healds 1330 and the plurality of healds 1340 included by the heald frames are alternately moved up and down. Then, between preceding reinforcing fibers 210 and new reinforcing fibers 220 whose vertical positions are changed by the vertical movement of healds 1330 and healds 1340, other fibers 230 are passed from weft insertion mechanism 1350 in a lateral direction substantially orthogonal to the direction in which the reinforcing fibers move. By repeating the above-described vertical movement and the passage of other fibers 230, textile portion 240 is formed in which preceding reinforcing fibers 210 and new reinforcing fibers 220 are warp threads and other fibers 230 are weft threads.

A method in which weft insertion mechanism 1350 passes other fibers 230 between preceding reinforcing fibers 210 and new reinforcing fibers 220 is not particularly limited. For example, a shuttle holding other fibers 230 may be passed between preceding reinforcing fibers 210 and new reinforcing fibers 220, a known weft insertion method such as a gripper or rapier may be used, or a method such as water jet or air jet may be used.

Textile portion 240 formed at this time may have such a strength that preceding reinforcing fibers 210 and new reinforcing fibers 220 are not easily untied even by a tension applied to reinforcing fibers 200 by production apparatus 100. For example, since the production apparatus usually applies a tension of the order of 1,000 cN to reinforcing fibers 200, textile portion 240 may have a strength preventing the textile portion from being untied when the tension of 1,000 cN is applied to the textile portion in the length direction of the reinforcing fibers.

In view of the above, the number of times of passing other fibers 230 (the number of weft threads in textile portion 240) is preferably 5 or more, more preferably 10 or more, and even more preferably 15 or more. In addition, from the viewpoint of shortening the length of textile portion 240 to be removed from the produced UD sheet, the number of times of passing other fibers 230 is preferably 100 or less, more preferably 80 or less, and even more preferably 50 or less.

The width of other fibers 230 in the moving direction of reinforcing fibers 200 is not particularly limited, but is preferably 0.01 mm to 100 mm, more preferably 0.05 mm to 80 mm, and still more preferably 0.1 mm to 60 mm from the viewpoint of shortening the length of textile portion 240 to be removed from the produced UD sheet.

Further, other fibers 230 that are weft threads may be arranged without gaps by a reed (not illustrated). However, in the case where such a strength as to prevent the textile portion from being untied is secured, or the like, the arrangement by the reed is not necessary. That is, textile portion 240 may have a gap formed between other fibers 230 adjacent to one another.

Other fibers 230 may be reinforcing fibers made of the same material as preceding reinforcing fibers 210 and new reinforcing fibers 220, or may be reinforcing fibers made of different materials, or may be other fibers. For example, when other fibers 230 are reinforcing fibers made of the same materials as the preceding reinforcing fibers and the new reinforcing fibers, relatively short excess fibers generated in producing or processing the reinforcing fibers to be impregnated with the resin can be used as other fibers 230, and the above-described excess fibers, which are usually discarded, can be reused. In addition, when other fibers 230 are reinforcing fibers made of a material different from the material of the preceding reinforcing fibers and the new reinforcing fibers, it is possible to suppress an increase in production cost by using relatively inexpensive reinforcing fibers as other fibers 230. Note that when other fibers 230 are reinforcing fibers made of the material different from the material of the preceding reinforcing fibers and the new reinforcing fibers, it is preferable that other fibers 230 have heat resistance such that untying of textile portion 240 due to melting or softening of the textile portion is not caused even at the temperature of the resin in impregnation section 150 in which the resin is melted at a high temperature. Examples of the other fibers include synthetic fibers such as nylon fibers, acrylic fibers, polyester fibers, and polyolefin fibers; natural fibers; and the like. Of these fibers, reinforcing fibers are preferable, and carbon fibers are more preferable from the viewpoint of improving the strength of textile portion 240 and preventing unintended tearing of the textile.

In this way, switching apparatus 130a connects preceding reinforcing fibers 210 and new reinforcing fibers 220 by forming textile portion 240. FIG. 3D schematically illustrates switching apparatus 130a after switching. After the formation of textile portion 240, preceding reinforcing fibers 210 are cut to stop the feeding of the preceding reinforcing fibers. Accordingly, only new reinforcing fibers 220 are fed out and sent to impregnation section 150. Since new reinforcing fibers 220 sent at this time are connected to preceding reinforcing fibers 210 by textile portion 240, it is possible to continuously produce the UD sheet while switching the reinforcing fibers, without stopping production apparatus 100.

The switching of the reinforcing fibers in one switching apparatus 130a has been described so far. In addition, the switching from the preceding reinforcing fibers to the new reinforcing fibers by forming the textile portion in the same manner is simultaneously performed also in the other switching apparatus 130b in the present embodiment. In addition, the new reinforcing fibers after the switching are arranged and united in a sheet shape at uniting section 128.

Meanwhile, in switching apparatuses 130, textile portion 240 is formed by disposing new reinforcing fibers 220 between adjacent reinforcing fibers of a plurality of moving preceding reinforcing fibers 210 spaced from one another. After the switching, new reinforcing fibers 220 are moved to positions corresponding to the gaps between the fibers of preceding reinforcing fiber 210. In the present embodiment, each of two switching apparatuses 130a and 130b exchanges the positions where preceding reinforcing fibers 210 move with the positions where new reinforcing fibers 220 move. Thus, as illustrated in FIG. 4A illustrating the uniting section before switching and FIG. 4B illustrating the uniting section after switching, in uniting section 128, the positions of reinforcing fibers 210 received from switching apparatus 130a (holding section 126a) and reinforcing fibers 220 received from switching apparatus 130b (holding section 126b) are changed such that the positions are exchanged before and after switching.

When switching apparatus 130 switches reinforcing fibers 200, production apparatus 100 may slow the moving speed of reinforcing fibers 200 until the reinforcing fibers pass switching apparatus 130 after being fed out from fiber feeding section 110, by using feeder 124a disposed on the downstream side of switching apparatus 130a and switching apparatus 130b and on the upstream side of accumulator 140. By reducing the moving speed of reinforcing fibers 200 in this range, it is possible to form textile portion 240 in which other fibers 230 that are the weft threads are disposed more densely, and thus it is possible to further increase the strength of textile portion 240.

At this time, accumulator 140 adjusts the length of the movement path of reinforcing fibers 200 to keep the moving speed of the reinforcing fibers at impregnation section 150 (the moving speed of the reinforcing fibers between accumulator 140 and winding section 160) at the same speed as in a case where the switching is not performed.

That is, accumulator 140 is configured to be capable of changing the length of the movement path of reinforcing fibers 200 to change the length (amount) of reinforcing fibers 200 passing through accumulator 140. Further, when reinforcing fibers 200 are not switched, the movement path of reinforcing fibers 200 at accumulator 140 is lengthened to increase the length (amount) of reinforcing fibers 200 passing through accumulator 140, and when switching apparatus 130 switches reinforcing fibers 200, the length (amount) of reinforcing fibers 200 passing through accumulator 140 is reduced. Accordingly, even when the passing speed of reinforcing fibers 200 in switching apparatus 130 is reduced, the amount of reinforcing fibers 200 sent from accumulator 140 to impregnation section 150 can be kept constant. In other words, accumulator 140 accumulates reinforcing fibers 200 when reinforcing fibers 200 are not switched, and discharges accumulated reinforcing fibers 200 little by little when switching apparatus 130 switches reinforcing fibers 200. Accordingly, the amount of reinforcing fibers 200 sent from accumulator 140 to impregnation section 150 can be kept constant.

Impregnation section 150 opens reinforcing fibers 200 and impregnates reinforcing fibers 200 with a resin (thermoplastic resin).

Impregnation section 150 first moves reinforcing fibers 200 along the surface of fiber-opening roller 152, and abrades reinforcing fibers 200 against fiber-opening roller 152 to open reinforcing fibers 200. Next, opened reinforcing fibers 200 are guided to impregnation roller 154 and moved along the surface of impregnation roller 154. Molten resin 158 extruded from extruder 156 is attached to and rotationally moves on the surface of impregnation roller 154, and reinforcing fibers 200 and the surface of impregnation roller 154 come into contact with each other, whereby resin 158 impregnates reinforcing fibers 200. The method of fiber opening and impregnation of the resin is not limited to the above method. For example, reinforcing fibers 200 may be abraded against a plurality of fiber-opening rollers during fiber opening, or vibrations may be applied to reinforcing fibers 200 during fiber opening. In addition, a sizing agent for facilitating impregnation with resin 158 may be applied to reinforcing fibers 200 during fiber opening. Further, at the time of impregnation, reinforcing fibers 200 may be impregnated with a resin by a method such as immersing the reinforcing fibers in a bath of molten resin.

Meanwhile, in the produced UD sheet, textile portion 240, which is a connecting portion of reinforcing fibers 200, is a portion that does not have the property of the UD sheet in which the reinforcing fibers are arranged to be oriented in a single direction. Therefore, the portion corresponding to textile portion 240 may be cut from the UD sheet and removed during the production or after the production.

In view of the above, production apparatus 100 may include a removal section that removes a portion where reinforcing fibers 200 forms a textile (a portion formed by impregnating textile portion 240 with a resin).

Figure 5:
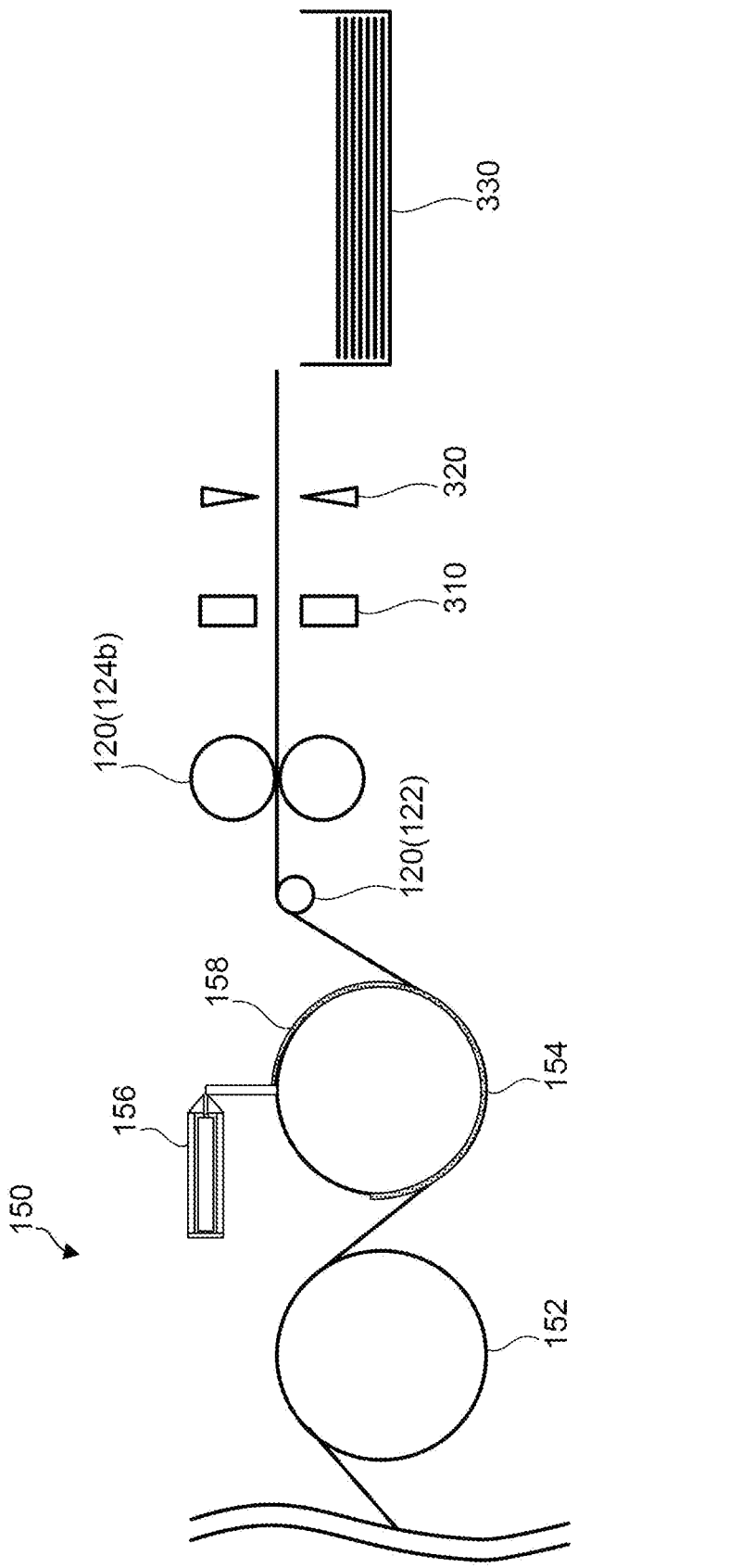
FIG. 5 schematically illustrates an exemplary configuration of a production apparatus for producing a fiber-reinforced resin in which reinforcing fibers are arranged to be oriented in a single direction, the product apparatus including a removal section that removes a portion where the reinforcing fibers form a textile.

For example, as illustrated in FIG. 5, production apparatus 300 for producing the fiber-reinforced resin in which the reinforcing fibers are arranged to be oriented in a single direction may include, on the downstream side of impregnation section 150, thickness measurement section 310 for measuring the thickness of a composite formed by impregnating reinforcing fibers 200 with resin, and cutting section 320 for cutting the composite. Since the configuration of production apparatus 300 on the upstream side of impregnation section 150 can be the same as that of production apparatus 100 illustrated in FIG. 1, only the configuration on the downstream side of impregnation section 150 is illustrated in FIG. 5. The composite to be subjected to thickness measurement and cutting may be a UD sheet in which the impregnating resin is cooled and solidified, or may be a composite before being cooled and solidified.

Thickness measurement section 310 measures the thickness of the composite after impregnation with the resin. The portion where reinforcing fibers 200 form the textile has an increased thickness due to textile portion 240. Other fibers 230 are woven and overlapped with preceding reinforcing fibers 210 and new reinforcing fibers 220 to form textile portion 240, and thus the thickness of the composite is larger than that of the other portions. Therefore, the portion where the thickness measured by thickness measurement section 310 is large can be determined as a portion of the composite where reinforcing fibers 200 form textile portion 240.

Cutting section 320 cuts the composite at positions before and after the portion where the thickness measured by thickness measurement section 310 is large and which is thus determined to be the portion where reinforcing fibers 200 form textile portion 240. It is thus possible to remove, from the composite, the portion where reinforcing fibers 200 form textile portion 240.

Note that the leading end portions of new reinforcing fibers 220 gripped by gripping section 1360 do not form textile portion 240. Similarly, the rear end portions of preceding reinforcing fibers 210 do not form textile portion 240. As such, cutting section 320 may also remove, from the composite, these portions of new reinforcing fibers 220 or preceding reinforcing fibers 210 that do not form textile portion 240. For example, cutting section 320 may remove, from the composite, a portion of the composite that includes a portion corresponding to textile portion 240 and a portion that is shorter than the same length as textile portion 240 (preferably, shorter than half the length of textile portion 240) on each of the upstream side and on the downstream side along the moving direction of reinforcing fibers 200.

The UD sheet from which the above-described portion have been removed is collected as the UD sheet in a sheet shape in collection section 330. In the present embodiment, a plurality of UD sheets are stacked and collected in collection section 330, but may also be collected in the form of a roll.

Note that the method of removing the portion where reinforcing fibers 200 form textile portion 240 is not limited to the above-described cutting, and the above-described portion may be removed by punching or the like, for example.

Further, the method of determining the above-described portion is not limited to the determining method based on the thickness of the composite. For example, removal may be performed after reinforcing fibers 200 of a predetermined length (length corresponding to one bobbin) is impregnated with resin, or may be performed based on a signal indicating that the reinforcing fibers have been connected in switching apparatus 130*a* and switching apparatus 130*b*.

[Materials and the Like]

The material of the above reinforcing fibers is not particularly limited. For example, carbon fibers, glass fibers, aramid fibers, alumina fibers, silicon carbide fibers, boron fibers, metal fibers, and the like can be used as the reinforcing fibers.

From the viewpoint of sufficiently enhancing the effect of improving the strength using the reinforcing fibers, the reinforcing fibers preferably have an average diameter of 1 μm or more and 20 μm or less, and more preferably 4 μm or more and 10 μm or less.

In addition, the reinforcing fibers may be subjected to sizing treatment with a sizing agent.

The sizing agent is not particularly limited, but is preferably a modified polyolefin, and more preferably a modified polyolefin containing a carboxylic acid metal salt. The modified polyolefin is, for example, a modified polyolefin in which a carboxylic acid group, a carboxylic acid anhydride group, or a carboxylic acid ester group is grafted onto a polymer chain of an unmodified polyolefin, and a salt is formed between the functional group and a metal cation.

The above-described unmodified polyolefin is preferably an ethylene polymer with a content of 50 mol % or more of the constituent units derived from ethylene, or a propylene polymer with a content of 50 mol % or more of the constituent units derived from propylene. Examples of the above-described ethylene polymer include ethylene homopolymer and copolymer of ethylene and α-olefin with 3 to 10 carbon atoms. Examples of the above-described propylene polymer include propylene homopolymer, and copolymer of propylene and ethylene or α-olefin with 4 to 10 carbon atoms. The unmodified polyolefin is preferably homopolypropylene, homopolyethylene, an ethylene-propylene copolymer, a propylene-1-butene copolymer, or an ethylene-propylene-1-butene copolymer.

Further, the reinforcing fibers may be bundled to form a fiber bundle. Preferably, the number of single threads per bundle of bundled reinforcing fibers is preferably 100 or more and 100,000 or less, and more preferably 1,000 or more and 50,000 or less.

The material of the above-described matrix resin is not particularly limited, and may be a thermoplastic resin or a thermosetting resin. Examples of the thermoplastic resin include polyolefin resins including polypropylene resins and polyethylene resins, polyamide resins, polyester resins, polycarbonate resins, polyacetal resins, polyether ketone resins, polyether ether ketone resins, polysulfone resins, and the like. The polypropylene resins and polyamide resins are preferable among the above resins. In addition, from the viewpoint of enhancing the affinity with the reinforcing fibers subjected to the sizing treatment using the sizing agent, the above-described matrix resin may contain the modified polyolefin described above.

Other Embodiments

Note that each of the above-described embodiments represents one example of the present invention. The present invention is not limited to the above-described embodiments, and it is needless to say that various other various embodiments are also possible within the scope of the idea of the present invention.

For example, by way of example, each of the above-described embodiments has been described in which preceding reinforcing fibers 210 and new reinforcing fibers 220 are reinforcing fibers made of the same material, but preceding reinforcing fibers 210 and new reinforcing fibers 220 may be reinforcing fibers made of respective different materials.

Further, each of the above-described embodiments has been described in relation to an example in which each of the two holding sections includes the switching apparatus, but may also has a configuration in which three or more holding sections include respective switching apparatuses, and unite reinforcing fibers from these holding sections at a uniting section, or a configuration in which a single switching apparatus is disposed on a single holding section and the holding section does not include any uniting section.

In addition, the reinforcing fibers fed out in each of the above-described embodiments may be used not only for producing the UD sheet, but also for producing a fiber-reinforced resin that is formed, for example, by chopping the reinforcing fibers and kneading it with a matrix resin, and in which the reinforcing fibers are randomly oriented and arranged.

The UD sheet produced by the above production apparatus can be used for automotive components including various modules such as instrument panels, door beams, undercovers, lamp housings, pedal housings, radiator supports, spare tire covers, front ends, and the like; electric and electronic components including notebook computers, mobile phones, digital still cameras, PDA, plasma displays, and the like; and home and office appliance components such as telephones, facsimiles, VTR, copiers, televisions, microwave ovens, audio equipment, toiletries, LaserDiscs (registered trademark), refrigerators, air conditioners, and the like. The UD sheet can also be used for pipes, pressure vessels, and the like by further forming the UD sheet.

Specific examples of applications of the UD sheet include primary structure materials including, for example, main wings, vertical and horizontal tails, secondary structure materials including, for example, ailerons, rudders and elevators, interior materials including, for example, seats and tables, component members for common air vehicles such as airplanes and helicopters, including for example, power plants, hydraulic cylinders and composite brakes, rocket component members including, for example, nozzle cones and motor cases, satellite component members including, for example, antennas, structures, solar panels, battery cases and telescopes, mechanical component members including, for example, frames, shafts, rollers, leaf springs, machine tool heads, robot arms, transport hands and synthetic fiber pots, component members for high-speed rotating bodies, including, for example, centrifuge rotors and uranium concentration cylinders, electronic and electric component members including, for example, parabola antennas, battery members, radars, acoustic speaker cones, computer components, printer components, personal computer housings and tablet housings, component members for automobiles and bikes, including, for example, frame components, semi-structural components, outer plate components, interior and exterior components, power plants, other equipment-hydraulic cylinders, brakes, battery cases, drive shafts, engine parts, spoilers, racing car bodies, crash cones, chairs, tablets, telephone covers, under covers, side covers, transmission covers, battery trays, rear steps, spare tire containers, bus body walls and truck body walls, vehicle component members including, for example, interior materials, floor panels, ceiling panels, linear motor car bodies, bullet train/railway car bodies, window wipers, dollies and seats, marine component members/fuselages including, for example, boats and ship hulls including, for example, yachts, cruisers and boats, and masts, ladders, propellers, hard sails, screws, military fuselages, submarine fuselages and deep sea exploration ships, component members for pressure vessels, including, for example, actuators, cylinders, bombs, hydrogen tanks, CNG tanks and oxygen tanks, scientific apparatus components/members including, for example, stirring blades, pipes, tanks, pit floors and plant piping, wind power generation component members including, for example, blades, skins, skeleton structures and de-icing systems, component members and goods for medical/nursing care equipment, including, for example, X-ray diagnostic apparatus components, wheelchairs, artificial bones, artificial legs/arms, axillary crutches, nursing care aids/robots (power assist suits), walking machines and nursing beds, civil engineering and infrastructure component members including, for example, CF composite cables, concrete strengthening members, guard rails, bridges, tunnel walls, hoods, cables, tension rods, strand rods and flexible pipes, component members for submarine oil field mining, including, for example, marine risers, flexible jumpers, flexible risers and drilling risers, sports and leisure goods including, for example, fishing rods, reels, golf clubs, tennis rackets, badminton rackets, ski plates, stocks, snowboards, ice hockey sticks, snowmobiles, bows, kendo bamboo swords, baseball bats, swim plungers, and sporting goods and sporting helmets for disabled peoples, bicycle components including, for example, frames, disc wheels, rims, handles and saddles, supplies including, for example, eyeglasses, bags, umbrellas and ballpoint pens, and other industrial component members and goods including, for example, plastic pallets, containers, logistics materials, resin molds, furniture, umbrellas, helmets, pipes, scaffolding boards, safety boots, protectors, fuel cell covers, drone blades, frame, jigs and jig frames.

The present application claims the benefit of priority based on Japanese Patent Application No. 2021-053384 filed on Mar. 26, 2021, the disclosure of which including the claims, specification, and drawings is incorporated herein by reference in its entirety.

INDUSTRIAL APPLICABILITY

A production apparatus for producing a fiber-reinforced resin in which reinforcing fibers are arranged to be oriented in a single direction according to the present invention is capable of connecting the preceding and following reinforcing fibers with a relatively simple configuration at the time of switching the reinforcing fibers. Therefore, the present disclosure is expected to facilitate continuous production of the fiber-reinforced resin to contribute to development in various fields using the fiber-reinforced resin, particularly the UD sheet.

REFERENCE SIGNS LIST

100, 300 Production apparatus for producing fiber-reinforced resin
110 Fiber feeding section
112 Spindle
114 Creel
116, 116a, 116b Bobbin
120 Guide path
122 Guide roll
124, 124a, 124b Feeder

13

126a, 126b Holding section
128 Uniting section
128a, 128b Roll
130a, 130b Switching apparatus
140 Accumulator
150 Impregnation section
152 Fiber-opening roller
154 Impregnation roller
156 Extruder
158 Molten resin
160 Winding section
200, 200a, 200b Reinforcing fiber
210 Preceding reinforcing fiber
220 New reinforcing fiber
310 Thickness measurement section
320 Cutting section
330 Collection section
1310, 1320 Heald frame
1330, 1340 Heald
1350 Weft insertion mechanism
1360 Gripping section

The invention claimed is:

1. A production apparatus for producing a fiber-reinforced resin in which a reinforcing fiber is arranged to be oriented in a single direction, the production apparatus comprising:
an impregnation section that impregnates the reinforcing fiber with a resin;
a switching apparatus that switches the reinforcing fiber from a preceding reinforcing fiber to a new reinforcing fiber at an upstream side of the impregnation section, wherein
when switching the reinforcing fiber, the switching apparatus connects the new reinforcing fiber and the preceding reinforcing fiber to each other by forming a textile in which the preceding reinforcing fiber and the new reinforcing fiber are used as warp threads and another fiber is used as a weft thread;
a gripping section that grips the new reinforcing fiber and guides the new reinforcing fiber to the switching apparatus; and
a cutting portion that cuts the preceding reinforcing fiber after the textile is formed, wherein
only the preceding reinforcing fiber passes the switching device before the switching of the reinforcing fiber, and
only the new reinforcing fiber passes the switching device after the switching of the reinforcing fiber.

2. The production apparatus for producing the fiber-reinforced resin according to claim 1, wherein
the switching apparatus includes:
a first heald that holds one of the new reinforcing fiber and the preceding reinforcing fiber and moves up and down,
a second heald that holds an other of the new reinforcing fiber and the preceding reinforcing fiber and moves up and down, and
a weft insertion mechanism that passes a reinforcing fiber laterally between reinforcing fibers held by the first heald and the second heald.

3. The production apparatus for producing the fiber-reinforced resin according to claim 1, further comprising:
a plurality of holding sections that, at respective different positions, hold a plurality of the reinforcing fibers; and
a uniting section that receives the plurality of reinforcing fibers from the plurality of holding sections, unites the plurality of reinforcing fibers, and delivers the plurality of reinforcing fibers to the impregnation section, wherein
a plurality of the switching apparatuses are disposed on the plurality of holding sections, respectively.

4. The production apparatus for producing the fiber-reinforced resin according to claim 3, wherein:
each of the plurality of holding sections holds the plurality of reinforcing fibers, and
the uniting section disposes a plurality of reinforcing fibers alternately to unite the plurality of reinforcing fibers into a sheet shape, the reinforcing fibers being received from the plurality of holding sections, and arrangement of the plurality of reinforcing fibers received from the plurality of holding sections is changed before and after switching of the reinforcing fiber by the switching apparatus.

5. The production apparatus for producing the fiber-reinforced resin according to claim 1, wherein
the switching apparatus forms the textile by using, as the weft thread, a reinforcing fiber that is made of a same material as the new reinforcing fiber and the preceding reinforcing fiber.

6. The production apparatus for producing the fiber-reinforced resin according to claim 1, wherein
the switching apparatus forms the textile by using, as the weft thread, a reinforcing fiber that is made of a material different from that of the new reinforcing fiber and the preceding reinforcing fiber.

7. The production apparatus for producing the fiber-reinforced resin according to claim 1, further comprising:
a removal section that removes, from the fiber-reinforced resin, a portion where the reinforcing fiber forms the textile, the fiber-reinforced resin being obtained by impregnation with a resin at the impregnation section.

8. The production apparatus for producing the fiber-reinforced resin according to claim 1, wherein
the reinforcing fiber is a carbon fiber.

9. The production apparatus for producing the fiber-reinforced resin according to claim 1, wherein
the resin is a thermoplastic resin.

10. A production method for producing a fiber-reinforced resin in which a reinforcing fiber is arranged to be oriented in a single direction, the production method comprising:
producing the fiber-reinforced resin while switching the reinforcing fiber, by using a production apparatus for producing the fiber-reinforced resin according to claim 1.

* * * * *